(No Model.) 5 Sheets—Sheet 1.

E. S. VOTEY, W. B. FLEMING & W. D. WOOD.
ELECTROPNEUMATIC STOP ACTION FOR PIPE ORGANS.

No. 536,978. Patented Apr. 2, 1895.

WITNESSES
O. B. Barnziger
M. A. Martin

INVENTORS
Edwin S. Votey
William D. Wood
William B. Fleming
By their Attorney
Newell S. Wright (No Model.) 5 Sheets—Sheet 2.

E. S. VOTEY, W. B. FLEMING & W. D. WOOD.
ELECTROPNEUMATIC STOP ACTION FOR PIPE ORGANS.

No. 536,978. Patented Apr. 2, 1895.

(No Model.) 5 Sheets—Sheet 3.

E. S. VOTEY, W. B. FLEMING & W. D. WOOD.
ELECTROPNEUMATIC STOP ACTION FOR PIPE ORGANS.

No. 536,978. Patented Apr. 2, 1895.

Witnesses
O. B. Baenziger
M. A. Martin

Edwin S. Votey  Inventors
William B. Fleming
William D. Wood
By their Attorney
Newell S. Wright.

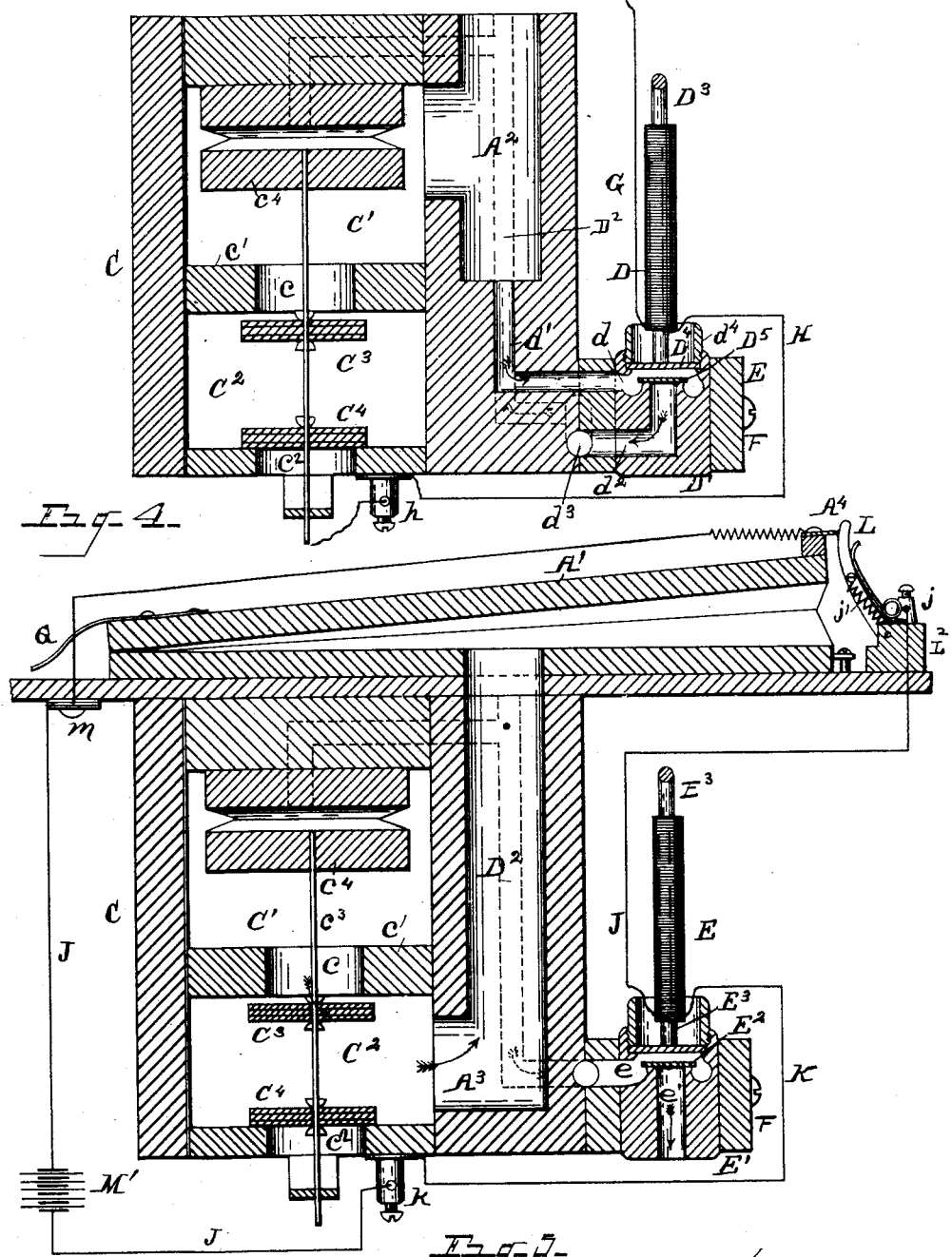

(No Model.) 5 Sheets—Sheet 5.

E. S. VOTEY, W. B. FLEMING & W. D. WOOD.
ELECTROPNEUMATIC STOP ACTION FOR PIPE ORGANS.

No. 536,978. Patented Apr. 2, 1895.

Witnesses
O. B. Basinger
M. A. Martin

Inventors
Edwin S. Votey
William B. Fleming
William D. Wood
By their Attorney
Newell S. Wright

THE NORRIS PETERS CO., PHOTO-LITHO., WASHINGTON, D. C.

UNITED STATES PATENT OFFICE.

EDWIN S. VOTEY, WILLIAM B. FLEMING, AND WILLIAM D. WOOD, OF DETROIT, MICHIGAN.

ELECTROPNEUMATIC STOP-ACTION FOR PIPE-ORGANS.

SPECIFICATION forming part of Letters Patent No. 536,978, dated April 2, 1895.

Application filed April 16, 1894. Serial No. 507,785. (No model.)

*To all whom it may concern:*

Be it known that we, EDWIN S. VOTEY, WILLIAM B. FLEMING, and WILLIAM D. WOOD, citizens of the United States, residing at Detroit, county of Wayne, State of Michigan, have invented a certain new and useful Improvement in Electropneumatic Stop-Actions for Pipe-Organs; and we declare the following to be a full, clear, and exact description of the invention, such as will enable others skilled in the art to which it appertains to make and use the same, reference being had to the accompanying drawings, which form a part of this specification.

Our invention has for its object an electro pneumatic stop action for pipe organs for controlling the supply of wind to the wind chest with which the pipes are connected, and it consists of the construction, combination and arrangement of devices and appliances hereinafter described and claimed, and illustrated in the accompanying drawings, in which—

Figure 1:
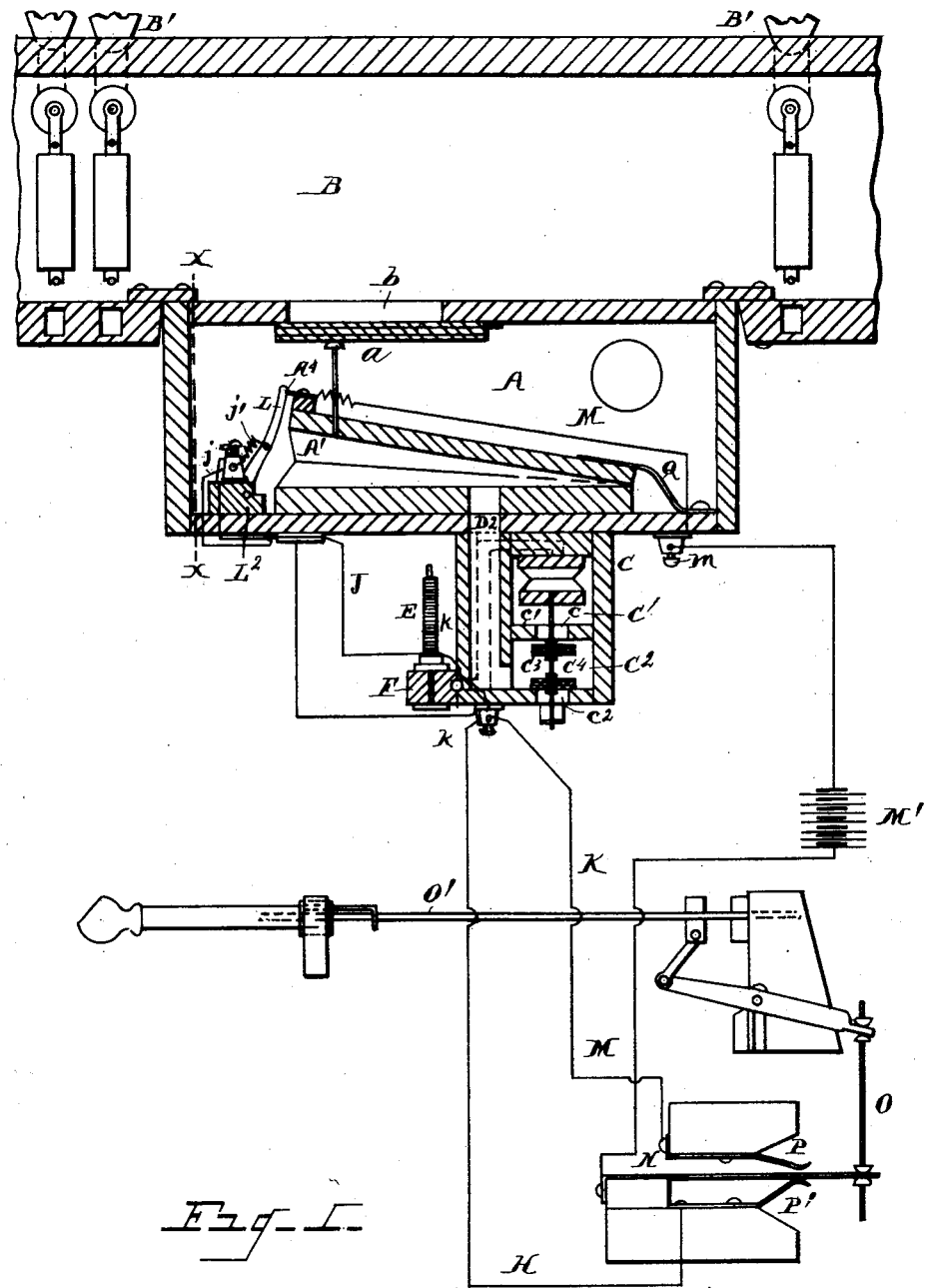
Figure 2:
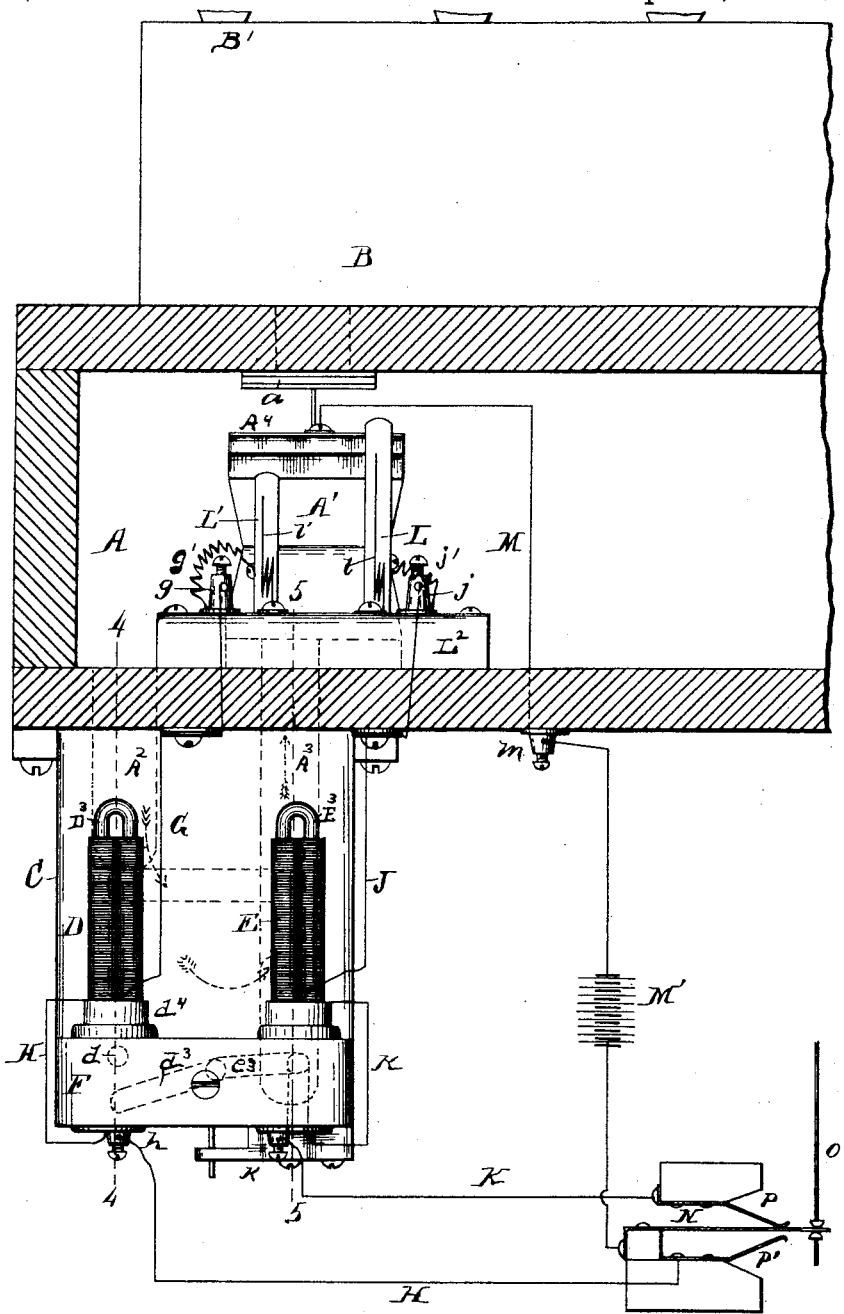
Figure 3:
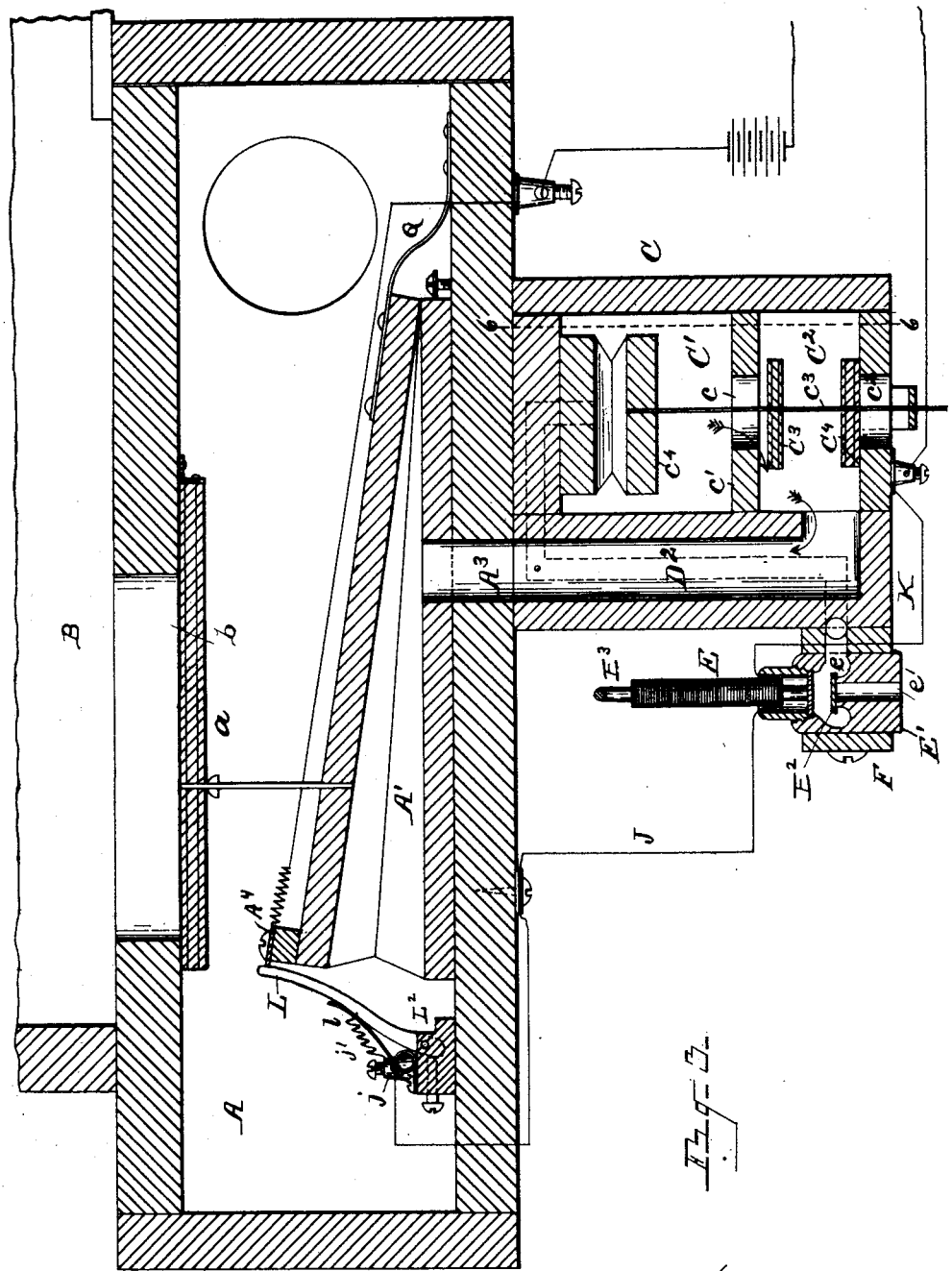
Figures 6, 7, 8:
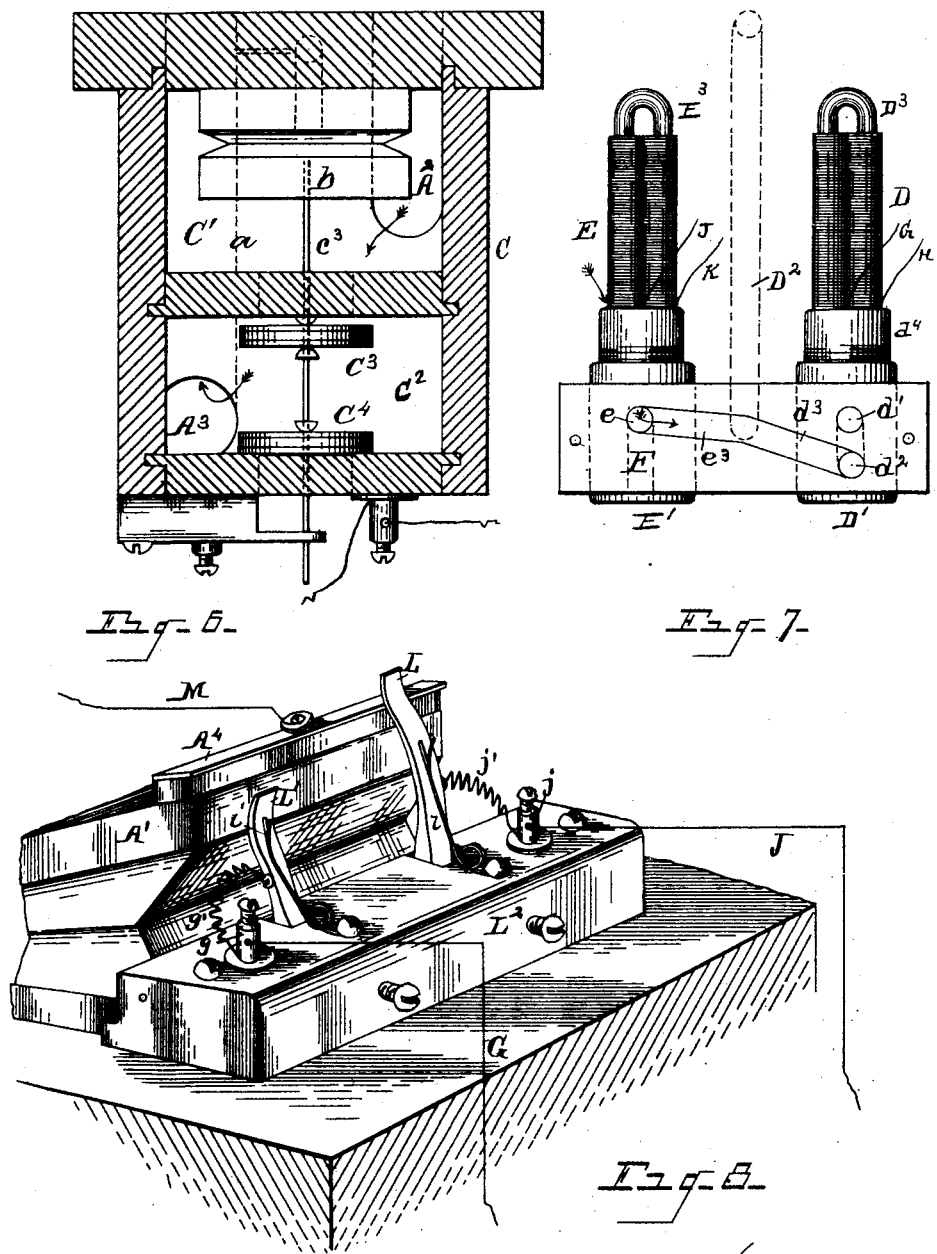

Figure 1 is a view in diagram, partly in section and partly in elevation, illustrating features of our invention. Fig. 2 is also a diagram view showing parts in elevation and parts in cross section on the line $x$—$x$ Fig. 1. Fig. 3 is an enlarged view in vertical section through the wind trunk and stop action magnet box. Fig. 4 is a separate view of the stop action magnet box, shown in vertical section on the line 4—4, Fig. 2. Fig. 5 is a similar view on the line 5—5, Fig. 2. Fig. 6 is a view in section on the line 6—6, Fig. 3. Fig. 7 is a rear elevation of the supply and exhaust magnets with their support. Fig. 8 is a detail view in perspective, showing a part of the pneumatic in the wind trunk and the adjacent lever.

Our invention is designed to provide a device of this nature simple and economical in construction and operation and of superior efficiency.

We carry out our invention as follows:

A represents a wind trunk, which is constantly filled with air when the organ is in use. A' represents a pneumatic therein. B is a wind chest, from which wind is fed to the pipes B', said wind chest B communicating with the wind trunk A, the communication "$b$" being controlled by a valve "$a$" connected with the pneumatic A' and operated thereby.

C represents a stop action box, constructed of two air chambers C' and C², communicating one with the other through an orifice "$c$" in the partition "$c'$" therebetween. The chamber C² is constructed with an exhaust orifice "$c^2$." The orifices "$c$" and "$c^2$" are controlled by valves C³ and C⁴ connected by a stem "$c^3$" with a pneumatic "$c^4$" in the chamber C'. The wind trunk A communicates with the chamber C' through a channel A². The pneumatic A' communicates with the chamber C² through a channel A³. It will be seen that when the valve C³ is unseated, the valve C⁴ closes the orifice "$c^2$" and that air is thereby allowed to pass from the chamber C' through the orifice "$c$" into the chamber C² and thence through the channel A³ into the pneumatic A' to inflate said pneumatic and close the valve "$a$." On the other hand when the valve C³ is closed air is cut off from the pneumatic A' and said pneumatic may then exhaust through the orifice "$c^2$."

It is to electrically operate the pneumatic "$c^4$" to actuate the valves C³ and C⁴ upon manipulating a corresponding stop, that our invention is more particularly directed. To this end we connect with the stop action magnet box a supply magnet D and an exhaust magnet E. These magnets are connected with the stop action magnet box by means of a channeled support or bracket F. The magnet D is constructed with a cup D' and the magnet E with a cup E' engaged with said support. The cup D' is constructed with an orifice "$d$" communicating with the passage A² through a channel "$d'$." It is also provided with an outlet passage "$d^2$" communicating with a passage D², communicating with the pneumatic "$c^4$," as indicated in dotted lines, Figs. 1, 3 and 5, particularly. To this end the bracket or support F and the adjacent portion of the stop action magnet box may be constructed with an intermediate channel "$d^3$" connecting the passage "$d^2$" with the passage D². The magnet D is also constructed with a magnet core D³, suitably wound with electrical conductors G and H. The poles of the magnet are united by a plate $D^4$ engaged in the upper portion of the cup $D'$ and held in place by a cap "$d^4$." An armature $D^5$ normally seats upon the passage "$d^2$" and controls the communication of the channels "$d$" and "$d^2$" one with the other when the magnet D is in electrical circuit. The armature $D^5$ is attracted to the plate $D^4$, opening the passage "$d^2$" into the passage "$d$." By this means it will be seen air is permitted to pass from the wind trunk through the passages $A^2$, "$d'$," "$d$," "$d^2$," "$d^3$" and $D^2$ into the pneumatic "$c^4$" to inflate it. By this means the valve $C^3$ is opened and the valve $C^4$ is closed, allowing air to pass through the channel $A^2$ into the wind chamber $C'$ and thence into the wind chamber $C^2$ and through the channel $A^3$ into the pneumatic A to inflate it and close the valve "$a$." The magnet E is similarly constructed with the exception that the cup $E'$ is constructed with exhaust orifices "$e$" and "$e'$," communicating one with the other, the communication being controlled by the armature $E^2$, made attractable by the poles of the magnet core $E^3$, which is wound with electrical conductors J and K. It will be perceived that when the magnet E is in electrical circuit the armature $E^2$ will be lifted off its seat, opening communication between the orifices "$e$," "$e'$," communicating with the pneumatic "$c^4$" through the channel $D^2$. It will be evident therefore that when the magnet E is in circuit, the pneumatic "$c^4$" is permitted to exhaust. The orifice "$e$" communicates with the channel $D^2$ through a connecting channel "$e^3$" analogous to the channel "$d^3$."

The pneumatic $A'$ is constructed with a metallic connection or bar $A^4$ upon its movable end. Adjacent to said end of the pneumatic $A'$ are located tilting levers L, $L'$, upon which bear springs "$l$," "$l'$" respectively. These levers L, $L'$ may have a jointed connection at their lower ends upon a support or block $L^2$, upon which are also located binding posts "$g$" and "$j$." The binding post "$g$" is electrically connected with the lever $L'$, while the binding post "$j$" is electrically connected with the lever L, as by conductors "$g'$" and "$j'$."

The conductor G of the magnet D is connected with the binding post "$g$." The conductor J leads from the magnet E to the binding post "$j$." A conductor M leads from the bar $A^4$ to the battery $M'$ through a binding post "$m$" on the case of the wind chest A. The lever L is extended upward above the corresponding end of the lever $L'$ and is preferably concaved on its face adjacent to the pneumatic $A'$. When the pneumatic $A'$ is inflated the bar $A^4$ forms electrical contact with the upper end of the lever L, thereby completing the circuit through the conductor J of the magnet E and the battery wire M. The magnet E is then in circuit and operative. At the same time the inflation of the pneumatic $A'$ lifts the bar $A^4$ above and out of contact with the lever $L'$ connected by the conductor G with the magnet D. Said magnet is then out of circuit and inoperative. When the pneumatic $A'$ exhausts, the bar $A^4$ is brought down into contact with the shorter lever $L'$ and out of contact with the lever L. Thus on the exhaust of the pneumatic $A'$ the circuit is closed in which the magnet D is located, and said magnet is thereby made operative, while the circuit in which the magnet E is located is broken and said magnet is rendered inoperative. The two magnets D and E are thus cut into and out of their respective circuits by the inflation and exhaustion of the pneumatic $A'$.

The wire H of the magnet D leads to a binding post "$h$" engaged upon the stop action magnet box. The conductor K of the magnet E is connected with a binding post "$k$," similarly located upon the stop action magnet box. The battery wire M leads to a metallic spring bar N connected with a stop rod O, shown more particularly in Figs. 1 and 2, operated by the corresponding stop $O'$.

P and $P'$ denote spring bars located on each side of the spring bar N in such a manner that when the corresponding stop is pulled outward the spring bar N, connected with the main battery wire M, will be lifted into contact with the spring bar P and out of contact with the spring bar $P'$. When the stop is pushed in the spring bar N will be in contact with the spring bar $P'$ and out of contact with the spring bar P. The magnet wire K of the magnet E through the binding post "$k$" is electrically connected with the spring bar P, while the magnet wire H through the binding post "$h$" is electrically connected with the spring bar $P'$. When, therefore, the stop $O'$ is in, the battery wire M is closed by the spring bar N upon the spring bar $P'$ and the circuit is normally closed through the magnet D. The circuit through said magnet D, however, is broken when the pneumatic $A'$ is inflated. When the stop is pulled out the magnet E through the wire K, binding post "$k$" and spring bar P, is in circuit with the battery $M'$, the circuit however, being broken when the pneumatic $A'$ is exhausted.

When the organ is not in use there will be, of course, no wind in the wind trunk A. The pneumatic $A'$ in such a case is held up in the position it occupies when inflated, by a spring Q. This is the normal condition of the pneumatic $A'$ when the organ is not in use. In this case the bar $A^4$ is in electrical contact with the lever L, the wire J of the magnet E and the stop being at the same time closed. The corresponding wire K of the magnet E is out of contact with the spring bar N and the battery wire M, so that no current from the battery $M'$ is being wasted. The magnet E, which is the exhaust magnet, is then inoperative, at the same time, owing to the elevated position of the pneumatic $A'$. The bar $A^4$ is out of contact with the lever $L'$ electrically connected with the magnet D, which is connected by the conductor H to the spring bar $P'$ in contact with the spring bar N, connected with the battery wire. Thus when there is no wind in the wind trunk A or when the organ is not in use, both magnets are out of electrical circuit.

The mode of operation is as follows: When the organ is not in use and is entirely emptied of compressed air, the pneumatic A' is held up by the spring Q, thereby closing the valve "$a$." The lever L is then in contact with the bar $A^4$. The circuit controlling the exhaust magnet E is therefore closed except at the contact pieces N, P, controlled by the stop O'. The magnets being both de-energized, both armature valves $D^5$, $E^2$, are closed. The pneumatic $c^4$ is thus necessarily expanded. Hence the contact bar $A^4$ and the lever L, being in contact, are in readiness to have the circuit closed by drawing out the stop O', which will bring the exhaust magnet E into circuit, venting the pneumatic $c^4$ which collapses, closing the valve $C^3$ and opening the valve $C^4$ thereby venting the pneumatic A' which collapses to open the valve "$a$." Now when the stop is pulled out the spring bar N is brought into contact with the spring bar P and the magnet E is in complete circuit with the battery and is made operative, lifting the armature $E^2$ and opening communication between the channel $D^2$ leading to the pneumatic "$c^4$," which is then permitted to exhaust through the channels "$e^3$," "$e$," "$e'$." The pneumatic "$c^4$" then exhausting, closes the valve $C^3$ and air is thereby no longer permitted to pass through the orifice "$c$" into the chamber $C^2$ and channel $A^3$ to the pneumatic A'. The pneumatic A' is thereby exhausted through the channel $A^3$ and orifice "$c^2$." This action of the pneumatic A' opens the valve "$a$." The organ being in use, it will thus be seen, that when the supply magnet D admitting air to the pneumatic "$c^4$" is operative, the exhaust magnet E is inoperative, and vice versa, the operation of the one magnet cutting the other magnet out of circuit.

We do not limit ourselves to the precise mechanism herein shown and described whereby the pulling out of the stop throws the exhaust magnet E into operation, as any suitable stop action may be employed for this purpose.

It will be seen that the pneumatic A' serves not only to operate the valve "$a$," but also as a contact breaker to form electrical connection with either the supply or exhaust magnet as it is inflated or exhausts.

It will be understood that in the wind trunk are located a series of pneumatics A' and its attendant features, and that a series of stop action magnet boxes with their supply and exhaust controlling magnets may be employed. It will be sufficient, however, to illustrate our invention to show a single stop action magnet box and its connection with a single pneumatic A'.

The cup D' and its cap "$d^4$" are preferably made of metal, the cap holding the plate $D^4$ firmly in place. So also the cup E with its corresponding cap are also made of metal. As so constructed there is no liability of shrinking and swelling, and therefore the parts will work accurately at all times and need no adjustment.

What we claim as our invention is—

1. In an organ the combination with a wind trunk provided with a pneumatic A', and a valve operated by said pneumatic, of a stop action magnet box communicating with said wind trunk and with said pneumatic, a pneumatic "$c^4$" located in said stop action magnet box, valves operated by said pneumatic "$c^4$," controlling the admission of wind to the pneumatic A' and the exhaust of air therefrom, substantially as described.

2. In an organ, a stop action magnet box provided with a pneumatic "$c^4$," valves controlled by said pneumatic, a supply controlling magnet controlling the passage of wind into said pneumatic and an exhaust controlling magnet to control the exhaust from said pneumatic, substantially as described.

3. In an organ, a stop action magnet box provided with a pneumatic, valves operated by said pneumatic, an air passage leading to said pneumatic, supply and exhaust controlling magnets, the supply controlling magnet constructed with a cup provided with a channel "$d$" communicating with an air supply, and a channel "$d^2$" communicating with the channel "$d$" and with said pneumatic, an armature controlling the communication of the channels "$d$," "$d^2$," and magnetic poles provided with electrical conductors to attract said armature, the exhaust controlling magnet constructed with a cup provided with a channel "$e$" communicating with said pneumatic and with an exhaust channel "$e'$" communicating with the channel "$e$" and leading to the exterior, an armature controlling the communication of the channels "$e$," "$e'$" and magnetic poles provided with electrical conductors to attract said armature, substantially as described.

4. In an organ the combination with a wind trunk, of a pneumatic A' and with metallic levers L, L' arranged to have electrical contact with the pneumatic alternately as the pneumatic inflates and exhausts, a stop action magnet box provided with a pneumatic "$c^4$," valves controlled by said pneumatic, supply and exhaust controlling magnets arranged to control the supply of wind to the pneumatic "$c^4$" and the exhaust of wind therefrom, a battery circuit and conductors connecting each of said magnets with the battery circuit and with the corresponding lever L, L' respectively, substantially as described.

5. In an organ the combination with a wind trunk, of a pneumatic A' and with metallic levers L, L' arranged to have electrical contact with the pneumatic alternately as the pneumatic inflates and exhausts, a stop action magnet box provided with a pneumatic "$c^4$," valves controlled by said pneumatic, supply and exhaust controlling magnets arranged to control the supply of wind to the pneumatic "$c^4$" and the exhaust of wind therefrom, a battery circuit and conductors connecting each of said magnets with the battery circuit and with the corresponding lever L, L' respectively, and stop actuated mechanism to throw the battery circuit into electrical connection with either of said magnets at the will of the operator, substantially as described.

6. In an organ the combination with a wind trunk provided with a pneumatic A' and a valve operated by said pneumatic, of a stop action magnet box communicating with said wind trunk and with said pneumatic, a pneumatic "$c^4$" in said box, valves operated by said pneumatic "$c^4$" to control the passage of wind into and out of the pneumatic A', a channel $D^2$ leading to the pneumatic "$c^4$," a support F provided with channels "$d^3$" and "$e^3$" communicating with the channel $D^2$, the supply controlling magnet also provided with a channel communicating with the channel $D^2$ and with an air supply, and an armature to control said pneumatic, the exhaust controlling magnet also provided with an exhaust channel communicating with the channel $D^2$, and an armature controlling said communication, substantially as described.

7. In an organ the combination with a wind trunk provided with a pneumatic A' and with a valve operated by said pneumatic, of a stop action magnet box constructed with chambers C', $C^2$, a channeled partition "$c'$" therebetween, and with an outlet passage leading from the chamber $C^2$, an air passage connecting the chamber C' with the wind trunk, an air passage $A^3$ connecting the chamber $C^2$ with said pneumatic, a pneumatic "$c^4$" provided with an air passage $D^2$ communicating therewith, valves operated by the pneumatic "$c^4$" to control the communication of said chambers and the outlet from the chamber $C^2$, supply and exhaust magnets to control the passage of wind into and out of the pneumatic "$c^4$," and means to throw said magnets alternately into operation at the will of the operator when the organ is in use, substantially as described.

8. In an organ the combination with a wind trunk provided with a pneumatic A', a valve operated by said pneumatic, a metal contact $A^4$ engaged with said pneumatic, a battery wire leading to said contact and with electrical conducting levers L, L' arranged to make electrical connection alternately with said contact as the pneumatic inflates and exhausts, a stop action magnet box communicating with said wind trunk and with said pneumatic, a pneumatic "$c^4$," valves operated by said pneumatic, and supply and exhaust controlling magnets to control the passage of air into and out of the pneumatic "$c^4$," said magnets each provided with an electrical conductor in circuit with the battery wire and with a conductor in electrical connection with the levers L, L' respectively, and mechanism to throw either of said magnets into or out of electrical connection with the battery wire at the will of the operator, substantially as described.

9. In an organ, the combination of a wind trunk A provided with a pneumatic A', a stop action magnet box C divided into two communicable compartments both communicable with said pneumatic and with said wind trunk, a pneumatic within one of said compartments communicable with said wind trunk, and valves operated by the pneumatic in the stop action magnet box to control said communications, said pneumatics electrically controlled, substantially as described.

10. The combination in an organ, of an electrical magnet constructed with a metal cup provided with communicable channels, an armature to control the communication therebetween, and air channels $D^2$ and $d'$ communicating with the first named channels, substantially as described.

11. In an organ, the combination with a stop action magnet box C provided with a pneumatic, a supply duct $A^2$ and a duct $D^2$ leading to said pneumatic, of an electrical magnet constructed with channels communicable one with another therethrough, an armature to control said communication, one of said channels communicating with the duct $A^2$ and the other channel communicating with the duct $D^2$, substantially as described.

In testimony whereof we sign this specification in the presence of two witnesses.

EDWIN S. VOTEY.
WILLIAM B. FLEMING.
WILLIAM D. WOOD.

Witnesses:
CALVIN W. GIBBS,
N. S. WRIGHT.